US008811174B2

(12) United States Patent
Chen

(10) Patent No.: US 8,811,174 B2
(45) Date of Patent: Aug. 19, 2014

(54) DATA COMMUNICATION METHOD AND SYSTEM, DATA SENDING/RECEIVING APPARATUS

(75) Inventor: Bin Chen, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 246 days.

(21) Appl. No.: 12/500,369

(22) Filed: Jul. 9, 2009

(65) Prior Publication Data

US 2009/0268637 A1 Oct. 29, 2009

Related U.S. Application Data

(63) Continuation of application No. PCT/CN2007/071341, filed on Dec. 27, 2007.

(30) Foreign Application Priority Data

Jan. 10, 2007 (CN) .......................... 2007 1 0004556

(51) Int. Cl.
*H04L 12/28* (2006.01)
*H04W 36/02* (2009.01)
*H04W 36/14* (2009.01)

(52) U.S. Cl.
CPC ............ *H04W 36/023* (2013.01); *H04W 36/14* (2013.01)
USPC .......................................... 370/231; 370/254

(58) Field of Classification Search
CPC ....... H04L 47/10; H04L 47/27; H04W 80/04; H04W 36/18; H04W 36/14; H04W 36/08; H04W 36/023
See application file for complete search history.

(56) References Cited

U.S. PATENT DOCUMENTS 7,821,996 B2 * 10/2010 Cai et al. ........................ 370/331
2001/0012279 A1 * 8/2001 Haumont et al. ............. 370/331

(Continued)

FOREIGN PATENT DOCUMENTS

CN 1518255 A 8/2004
CN 1784922 A 6/2006

(Continued)

OTHER PUBLICATIONS

English Translation of Written Opinion of the International Searching Authority for PCT Application No. PCT/CN2007/071341, mailed Apr. 10, 2008, 5 pgs.

(Continued)

*Primary Examiner* — Ayaz Sheikh
*Assistant Examiner* — Mounir Moutaouakil
(74) *Attorney, Agent, or Firm* — Slater & Matsil, L.L.P.

(57) ABSTRACT

A data communication method includes: a Radio Network Controller (RNC) sends a notification message to a Node B to instruct the Node B to perform proper operations after a specific event occurs on the User Equipment (UE). A data communication system, a data sending apparatus and a data receiving apparatus are also provided in an embodiment of the present disclosure. Through the technical solution under the present disclosure, when specific events such as cell handover, disconnection and state transition occur on the UE, the RNC that obtains the event information may send a notification message to Node B to instruct the Node B to perform proper operations. Therefore, the Node B is prevented from continuing to send the buffered UE data from the source cell; and in the Cell_FACH state, the present disclosure saves the radio channel resources, shortens the transmission delay, and reduces the transmission packet loss ratio.

11 Claims, 6 Drawing Sheets

(56) References Cited

U.S. PATENT DOCUMENTS

| | | | |
|---|---|---|---|
| 2002/0075850 A1* | 6/2002 | Cruz et al. | 370/352 |
| 2004/0042436 A1* | 3/2004 | Terry et al. | 370/341 |
| 2005/0020260 A1 | 1/2005 | Jeong et al. | |
| 2005/0221825 A1* | 10/2005 | Osugi | 455/436 |
| 2006/0240830 A1* | 10/2006 | Ranta-aho et al. | 455/436 |
| 2007/0060153 A1 | 3/2007 | Torsner et al. | |
| 2009/0028123 A1* | 1/2009 | Terry et al. | 370/341 |
| 2009/0097399 A1* | 4/2009 | Mahasoom et al. | 370/216 |
| 2009/0268637 A1 | 10/2009 | Chen | |
| 2010/0040161 A1* | 2/2010 | Ode et al. | 375/260 |
| 2012/0230197 A1* | 9/2012 | Terry et al. | 370/235 |

FOREIGN PATENT DOCUMENTS

| | | |
|---|---|---|
| CN | 1964560 A | 5/2007 |
| CN | 101072431 A | 11/2007 |
| CN | 101222419 A | 7/2008 |
| CN | 102231895 A | 11/2011 |
| EP | 1 501 328 A2 | 1/2005 |
| EP | 1 592 275 | 11/2005 |
| WO | WO 2005/079085 A1 | 8/2005 |

OTHER PUBLICATIONS

European Patent Office Communication in Application No. 07846167.0, which encloses an extended European search report which includes, pursuant to Rule 62 EPC, the supplementary European search report (Art. 153(7)) EPC) and the European search opinion, dated Jan. 19, 2010, 9 pgs.

Siemens, "Cell Update with USCH/DSCH", Releases: TS25.931 v. 3.0.0/Release 99, TSG-RAN Working Group 3, Meeting #11, Sophia Antipolis, France, Feb. 28-Mar. 3, 2000, dated Feb. 24, 2000, 3 pgs.

Nokia, "Analysis of HSDPA in CELL_FACH State", $3^{rd}$ Generation Partnership Project (3GPP) Technical Specification Group (TSG) Radio Access Network (RAN); Working Group 1, Seoul South Korea, Oct. 9-13, 2006, vol. R1-062884, dated Oct. 9, 2006, 5 pgs.

Universal Mobile Telecommunications System (UMTS); High Speed Downlink Packet Access (HSDPA); Overall Description; Stage 2 (3 GPP TS 25.308 version 7.1.0 Release 7), ETSI Standards, LIS, Sophia Antipolis, Cedex, France, vol. 3-R2, No. V7.1.0, Dec. 1, 2006, 36 pgs.

International Search Report from the Chinese Patent Office for International Application No. PCT/CN2007/071341, Jul. 14, 2009.

European Office Action received in European Application No. 07846167.0-2412, mailed Mar. 20, 2012, 4 pages.

Communication pursuant to Article 94(3) EPC received in Application No. 07 846 167.0-2412, Applicant: Huawei Technologies Co., Ltd., mailed Jan. 13, 2013, 6 pages.

3GPP TS 25.427, 3rd Generation Partnership Project; Technical Specification Group Radio Access Network; UTRAN Iub/Iur interface user plane protocol for DCH data streams (Release 7), V7.1.0 (Jun. 2006), 44 pages.

3GPP TS 25.433, 3rd Generation Partnership Project; Technical Specification Group Radio Access Network; UTRAN Iub interface Node B Application Part (NBAP) signalling (Release 7), V7.3.0 (Dec. 2006), 848 pages.

* cited by examiner

DATA COMMUNICATION METHOD AND SYSTEM, DATA SENDING/RECEIVING APPARATUS

CROSS-REFERENCE TO RELATED APPLICATIONS

This application is a continuation of International Patent Application No. PCT/CN2007/071341, filed on Dec. 27, 2007, which claims the benefit of priority of Chinese Patent Application No. 200710004556.8, filed on Jan. 10, 2007, titled "DATA COMMUNICATION METHOD AND SYSTEM, DATA SENDING/RECEIVING APPARATUS", the entire contents of all of which are incorporated herein by reference in their entireties.

FIELD OF TECHNOLOGY

The present disclosure relates to the communication field, and in particular, to a data communication method and system, and a data sending apparatus and a data receiving apparatus.

BACKGROUND OF THE DISCLOSURE

Starting from Release 5 (R5), the $3^{rd}$ Generation Partnership Project (3GPP) provides a High Speed Downlink Packet Access (HSDPA) mechanism to enable high-speed transmission of downlink packets in the air interface. This mechanism adds processing of a MAC-hs layer in addition to the Media Access Control (MAC) layer and the physical layer. The MAC-hs layer comes out of a base station, Node B, and is implemented through interaction between the High Speed Downlink Shared CHannel (HS-DSCH), High Speed Physical Downlink Shared CHannel (HS-PDSCH), High Speed downlink Shared Control CHannel (HS-SCCH), and HS-DSCH Dedicated uplink Physical Control CHannel (HS-DPCCH). The channel features of HS-SCCH, HS-DPCCH and HS-DSCH are configured by the Radio Network Controller (RNC) for a User Equipment (UE) at the time of setting up a radio bearer.

The current protocol stipulates that only the UE in the Cell_Dedicated CHannel (Cell_DCH) state can receive data on the HSDPA related channels. The UE in the Cell_Forward Access Channel (Cell_FACH) state lacks the dedicated control channel and the uplink auxiliary control channel applicable to the HSDPA, and therefore, cannot receive data on the HSDPA related channels. Moreover, the information on the UE in the Cell_FACH state is stored only on the RNC, and the Node B stores no UE information.

In the conventional art, the data communication process of the UE in the Cell_FACH state comes in two modes:

The RNC schedules a resource for the UE, sends the data directed to the UE to the Node B, and specifies the time of sending the data to each UE. The Node B does not schedule the resource, but sends the data to the corresponding UE directly at the time specified by the RNC.

The RNC sends the data directed to the UE to the Node B first. After receiving the data directed to the UE, the Node B schedules the resource and selects a proper time for sending the data to the corresponding UE according to the resource utilization state.

However, in the conventional art, when the UE undergoes certain events, such as cell handover, disconnection, and state transition, the UE notifies the event information to the RNC. However, the Node B is not aware of it and continues to send the buffered UE data from the source cell, which leads to waste of radio channel resources.

SUMMARY OF THE DISCLOSURE

Various embodiments of the present disclosure provide a data communication method and system, a data sending apparatus, and a data receiving apparatus, so as to overcome waste of radio channel resources of the UE in the Cell_FACH state.

A data communication method includes: sending, by an RNC, a notification message to a Node B to instruct the Node B to perform proper operations after a specific event occurs on a UE.

A data communication system includes: an RNC, adapted to send a notification message to a Node B after a specific event occurs on a UE; and a Node B, adapted to receive the notification message and perform proper operations according to the notification message.

A data sending apparatus includes: a data sending module, adapted to send data of a UE to a Node B; and a notification message sending module, adapted to send a notification message to the Node B after a specific event occurs on the UE.

A data receiving apparatus includes: a data obtaining module, adapted to receive data of a UE and a notification message from an RNC; and a data processing module, adapted to perform proper operations according to the notification message received by the data obtaining module.

The foregoing technical solution discloses that in method, system and apparatus provided in embodiments of the present disclosure, the RNC sends a notification message to Node B to instruct the Node B to perform proper operations after a specific event occurs on the UE. In this way, when specific events such as cell handover, disconnection and state transition occur on the UE, the RNC that obtains the event information may send a notification message to the Node B to instruct the Node B to perform proper operations. Therefore, the Node B is prevented from continuing to send the buffered data of the UE from the source cell, thus saving the radio channel resources, shortening the transmission delay, and reducing the transmission packet loss ratio.

DETAILED DESCRIPTION OF THE EMBODIMENTS

In order to make the technical solution, objectives and merits of the present disclosure clearer, a detailed description of the present disclosure is hereinafter given by reference to accompanying drawings and exemplary embodiments.

Embodiment 1

A data communication method applicable to the UE in the Cell_FACH state is provided in this embodiment.

Figure 1:
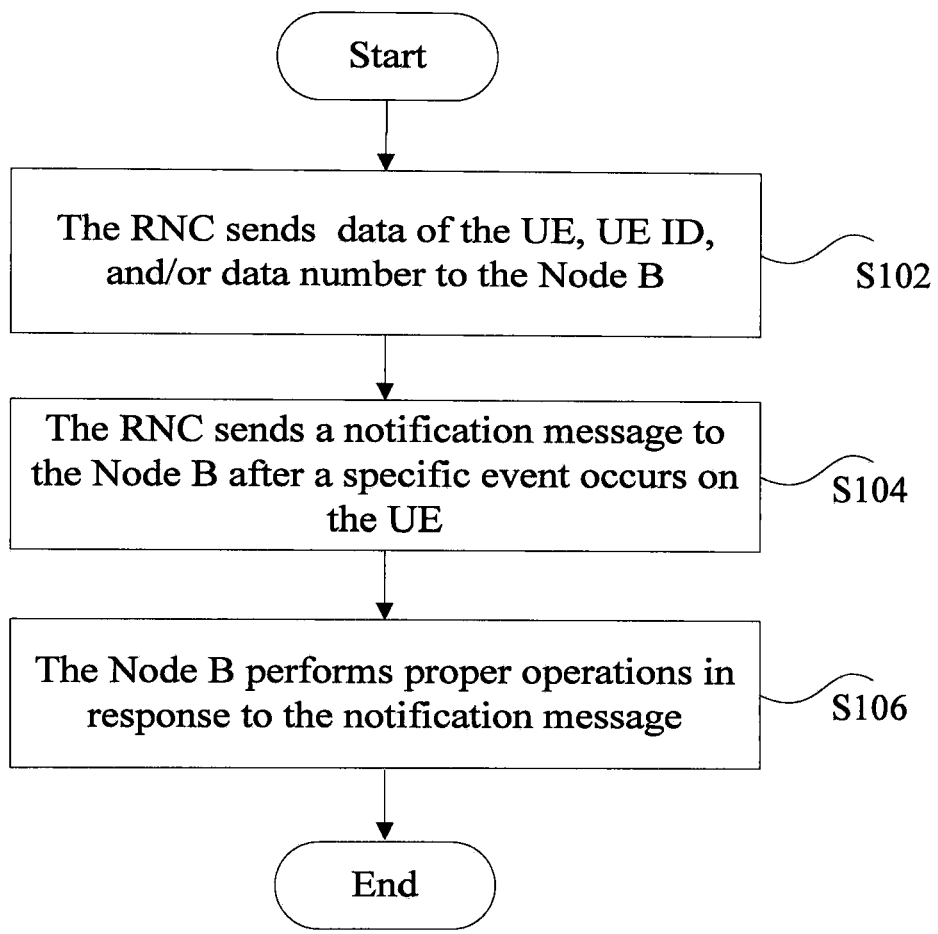
FIG. 1 is a flowchart of a data communication method of an UE in the Cell_FACH state in the first embodiment of the present disclosure.

As shown in FIG. 1, the method includes the following steps:

Step S102: The RNC sends data of the UE, a UE ID (which indicates the UE corresponding to the data) and/or a data number to the Node B (preferably, through a Framing Protocol (FP)), or the RNC sends only the data without carrying the UE ID or data number.

Step S104: The RNC preferably sends a notification message (in this embodiment, a Cell_FACH UE message) to Node B through an NBAP protocol after a specific event occurs on the UE.

Step S106: The Node B performs proper operations in response to the notification message.

Figure 2:
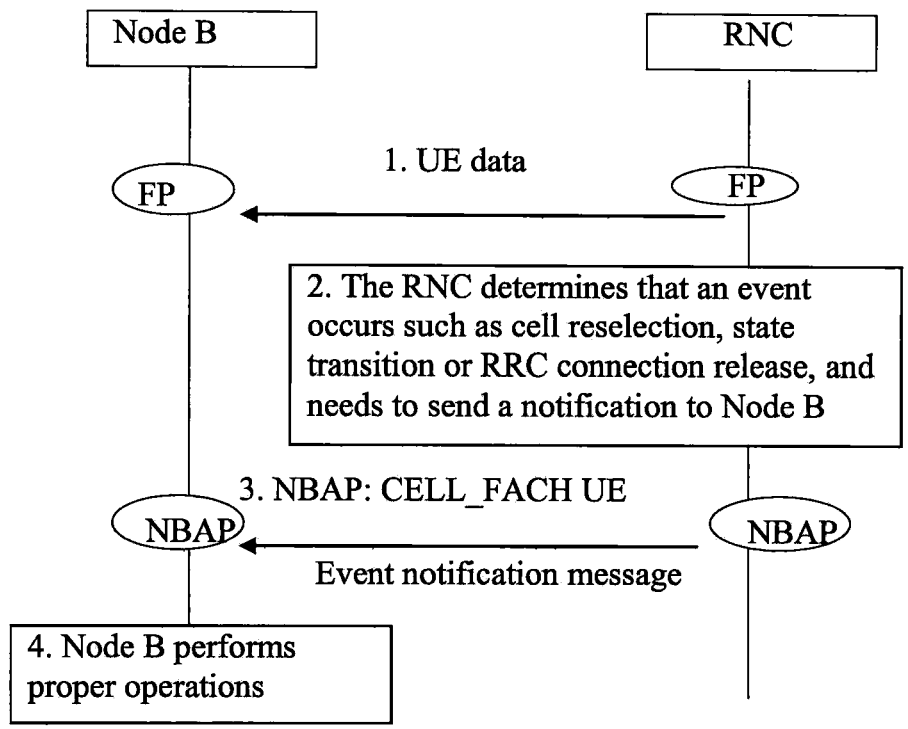
FIG. 2 is a signaling flowchart of a data communication method of an UE in the Cell_FACH state in the first embodiment of the present disclosure.

The foregoing process can be understood by reference to FIG. 2.

For example, if an FP protocol frame carries data of multiple UEs, multiple UE IDs are required to correspond to the data. A UE ID may be a UMTS Terrestrial Radio Access Network (UTRAN), Radio Network Temporary Identifier (RNTI), which is abbreviated as U-RNTI, Cell-Radio Network Temporary Identifier (C-RNTI), or another identifier.

The specific events include but are not limited to: cell reselection, state transition, and release of radio resource control connection.

The foregoing notification message may be a data conversion cell message, UE cell reselection message, data release command message, or another newly defined message.

Besides, the foregoing notification message carries: UE ID information, target cell information, or data number information, or any combination thereof. When a UE performs cell reselection in the Node B, the RNC carries the target cell information, or the RNC carries the target cell information directly without considering whether the UE performs cell reselection within the Node B.

Besides, the foregoing notification message may further carry action indication information. The action indication information instructs the Node B to: release the UE context, release data, transfer data to the target cell for sending, suspend sending, or resume sending, or any combination thereof.

S106 is detailed below, where the Node B may adopt multiple processing modes, depending on the information carried in the notification message.

Instance 1

Figure 3:
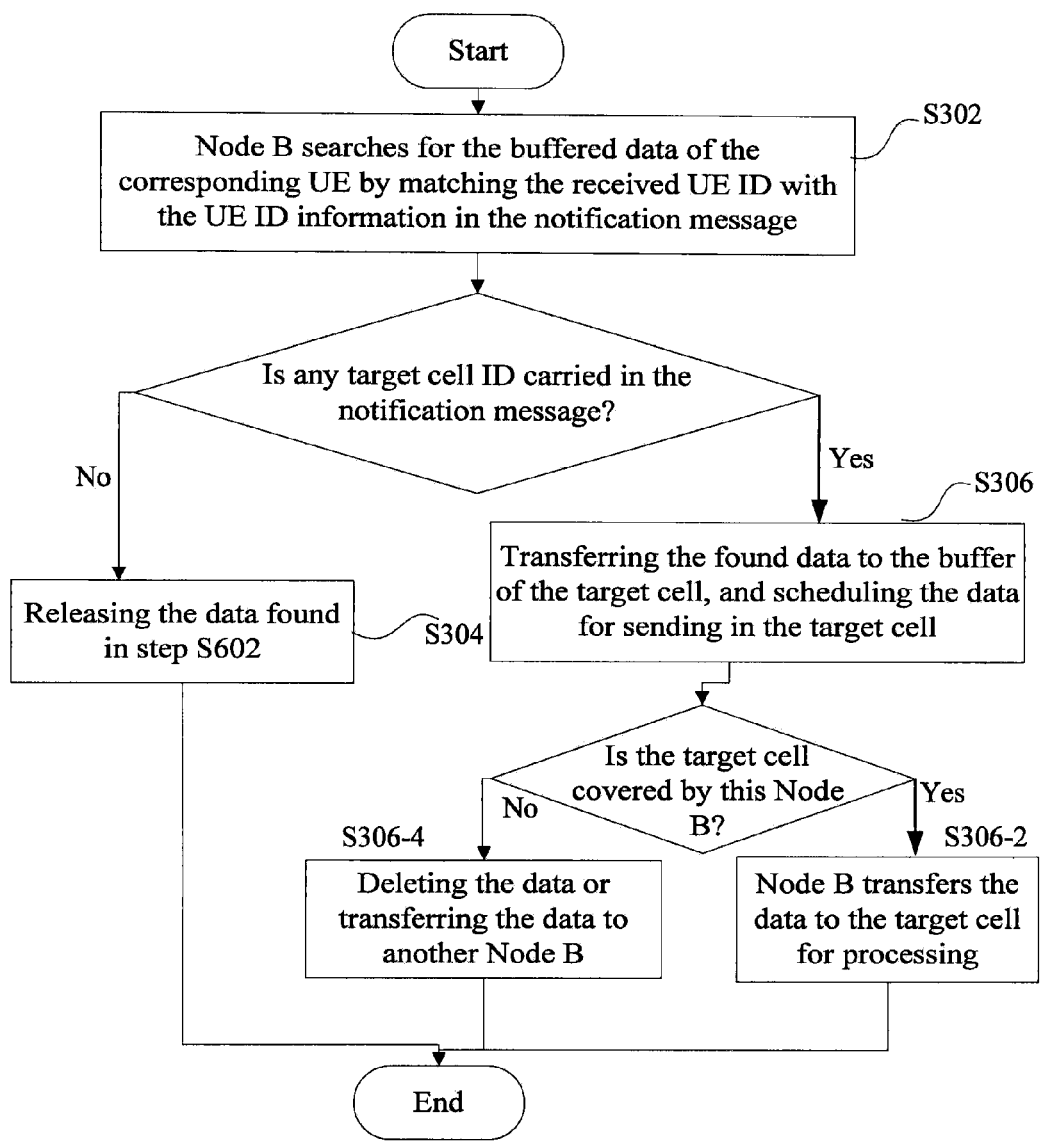
FIG. 3 is a flowchart of a method provided in the first embodiment of the present disclosure.

As shown in FIG. 3, the Node B in this embodiment performs the following steps:

Step S302: The Node B searches for the buffered data of the corresponding UE by matching the received UE ID with the UE ID information carried in the notification message.

Step S304: The Node B releases the data found in step S302 if the notification message carries no target cell ID.

Step S306: If the notification message carries a target cell ID, the Node B transfers the data found in step S302 to the buffer of the target cell, and schedules the data for sending in the target cell.

In step S306, if the target cell is covered by this Node B, the Node B transfers the data to the target cell for processing (S306-2); if the target cell is not covered by this Node B, the data is deleted or transferred to the other Node B (step S306-4).

Besides, if the RNC in step S102 sends no UE ID, Node B decodes the header of the data sent by the RNC first in step S302, and obtains the UE ID in the header.

In this embodiment, Node B searches for data through the UE ID. In practice, the present disclosure is not limited to that. In the second instance described below, Node B searches for data through a data number.

Instance 2

Figure 4:
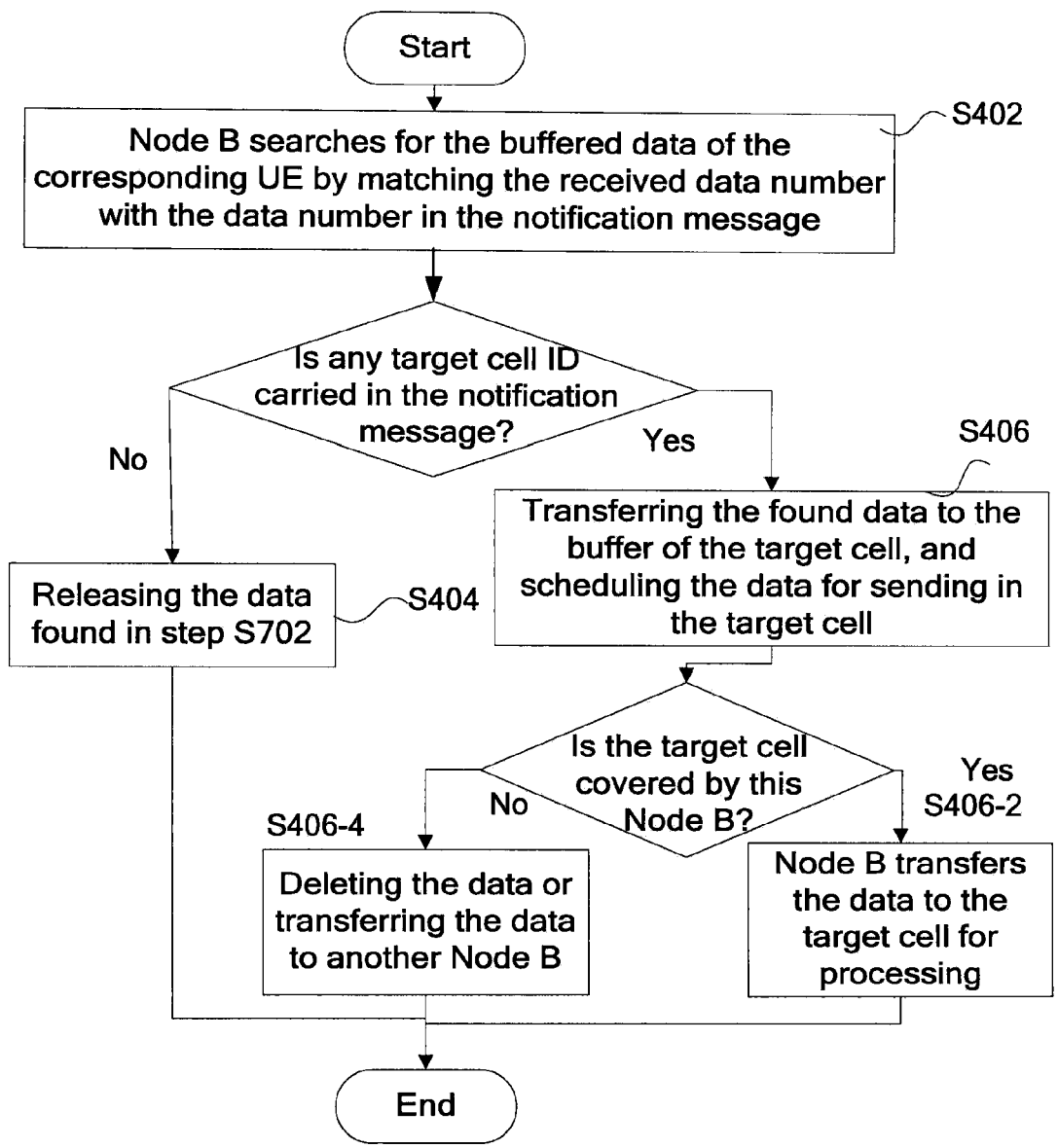
FIG. 4 is a flowchart of a method provided in the second embodiment of the present disclosure.

As shown in FIG. 4, the Node B in this embodiment performs the following steps:

Step S402: The Node B searches for the buffered data of the corresponding UE by matching the received data number with the data number information carried in the notification message.

Step S404: If the notification message carries a target cell ID, the Node B transfers the data found in step S402 to the buffer of the target cell, and schedules the data for sending in the target cell.

Step S406: The Node B releases the data found in step S402 if the notification message carries no target cell ID.

In step S406, if the target cell is covered by this Node B, the Node B transfers the data to the target cell for processing (S406-2); if the target cell is not covered by this Node B, the data is deleted or transferred to the other Node B (step S406-4).

It is worthy of attention that the Node B described in the foregoing instance performs operations according to the target cell ID, which is for the exemplary purpose only. The example is intended for better understanding rather than limitation of the present disclosure.

Instance 3

Figure 5:
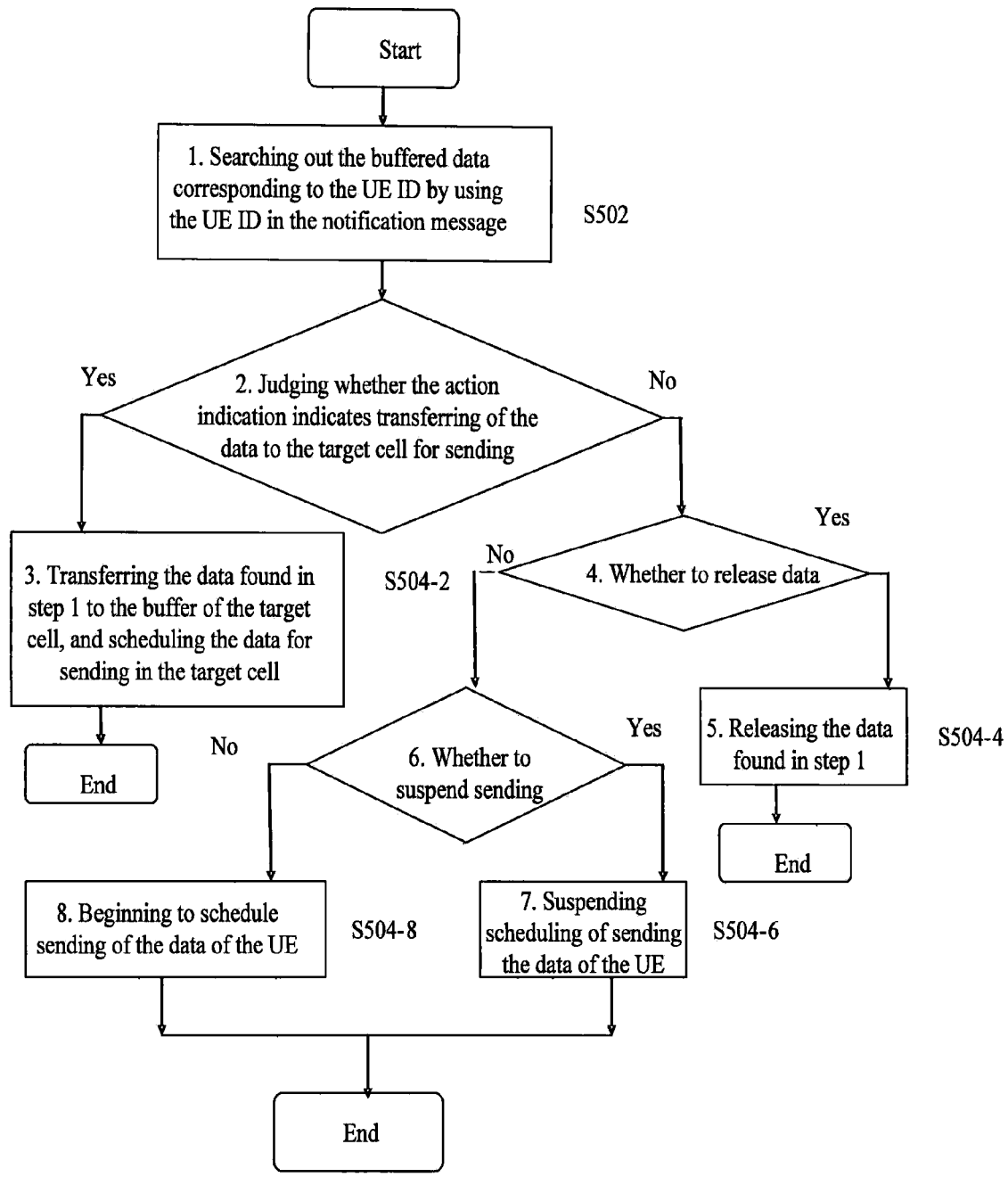
FIG. 5 is a flowchart of a method provided in the third embodiment of the present disclosure.

As shown in FIG. 5, the Node B in this embodiment performs the following steps:

Step S502: The Node B searches for the buffered data of the corresponding UE by matching the received UE ID with the UE ID information carried in the notification message.

Step S504: The Node B performs the relevant operations according to the action indication information carried in the notification message.

Specifically, step S504 further includes:

If the action indication information carried in the notification message instructs the Node B to transfer the data to the target cell for sending, the Node B transfers the data found in step S502 to the buffer of the target cell, and schedules the data for sending in the target cell (step S504-2).

If the action indication information instructs the Node B to release the data or release the UE context, the Node B releases the data found in step S502 (step S504-4).

If the action indication information does not indicate transferring of the data to the target cell, releasing of the UE context, or releasing of the data, but indicates suspension of sending, the Node B suspends scheduling of sending the data found in step S502 (step S504-6).

Besides, if no suspension of scheduling is indicated, the Node B begins to schedule sending of the data of the UE (step S504-8).

The process in this instance is for exemplary purpose only. In practice, the notification message may carry no action indication of suspending the sending process or resuming the sending process; and accordingly, the operations of Node B vary with the action indication.

The foregoing process reveals that:

When the RNC detects cell reselection, state transition or RRC connection release on the UE, the RNC notifies the Node B if no further data needs to be sent from the source cell, and the Node B may stop sending data to the UE or transfer the data to the target cell for sending. This saves the radio channel resources of the source cell. Moreover, the data may be transferred to the target cell for sending, thus avoiding data loss and preventing increase of data transmission delay caused by retransmission of the RLC.

Embodiment 2

A data communication system applicable to the UE in the Cell_FACH state is provided in this embodiment.

Figure 6:
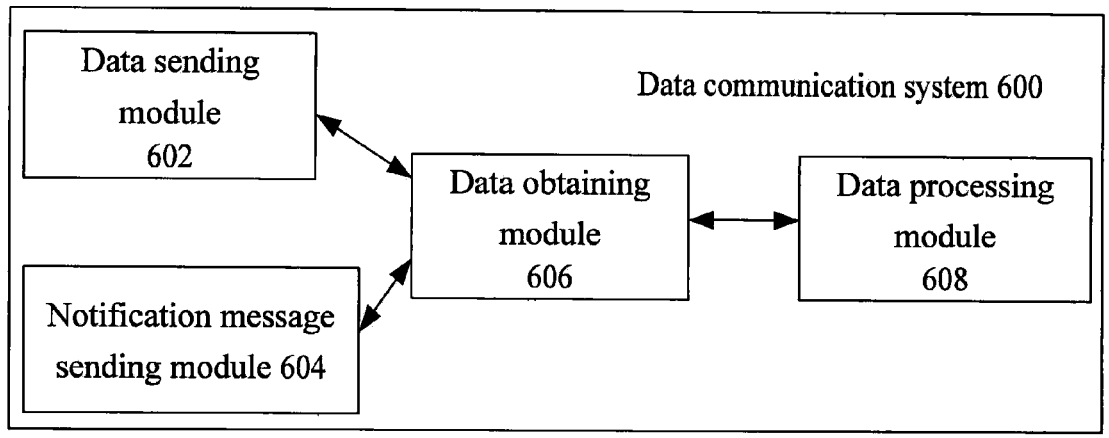
FIG. 6 is a block diagram of a data communication system of an UE in the Cell_FACH state in the second embodiment of the present disclosure.

As shown in FIG. 6, the data communication system 600 includes: a data sending module 602, located at the RNC side and adapted to send one or more of these items to a Node B: data of the UE, UE ID, and data number; a notification message sending module 604, located at the RNC side and adapted to send a notification message to the Node B after the RNC determines that a specific event occurs on the UE; a data obtaining module 606, located at the Node B side and adapted to: receive the information from the data sending module 602, respond to the notification message, and obtain the buffer data of the UE; and a data processing module 608, located at the Node B side and adapted to process the data obtained by the data obtaining module 606

The notification message sent by the notification message sending module 604 carries: UE ID information, target cell information, or data number information, or any combination thereof. Moreover, the notification message carries action indication information. The action indication information instructs the Node B to: release the UE context, release data, transfer data to the target cell for sending, suspend sending, or resume sending, or any combination thereof.

The data obtaining module 606 searches for the buffered data of the corresponding UE by matching the UE ID/data number sent by the data sending module 602 with the UE ID information/data number information carried in the notification message.

The data processing module 608 performs the following operations according to the action indication information carried in the notification message:

If the action indication information carried in the notification message indicates transferring of the data to the target cell for sending, the data processing module 608 transfers the data obtained by the data obtaining module 606 to the buffer of the target cell, and schedules the data for sending in the target cell.

If the action indication information indicates releasing of the data or releasing of the UE context, the data processing module 608 releases the data obtained by the data obtaining module 606.

If the action indication information does not indicate transferring of data to the target cell, releasing of the UE context, or releasing of the data, but indicates suspension of sending, the data processing module 608 suspends scheduling of sending the data obtained by the data obtaining module 606.

If the action indication information does not indicate UE context, transferring of data to the target cell, releasing of the data, or suspension of sending, the data processing module 608 begins to schedule sending of the data obtained by the data obtaining module 606.

Embodiment 3

A data sending apparatus applicable to the UE in the Cell_FACH state is provided in this embodiment. The apparatus is located at the RNC side.

Figure 7:
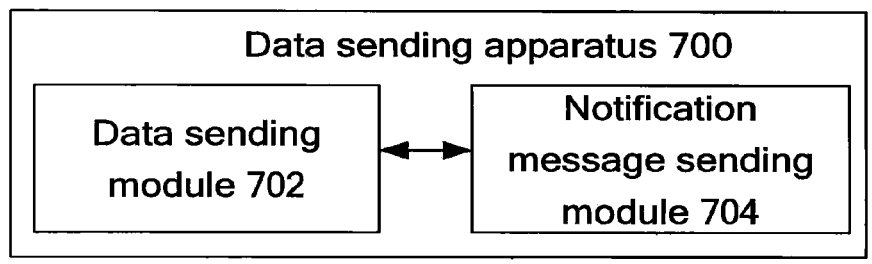
FIG. 7 is a block diagram of a data sending apparatus of an UE in the Cell_FACH state in the third embodiment of the present disclosure.

As shown in FIG. 7, the data sending apparatus 700 includes: a data sending module 702, adapted to send one or more of these items to a Node B: data of the UE, UE ID, and data number; and a notification message sending module 704, adapted to send a notification message to the Node B when a specific event occurs on the UE.

A specific event may be: cell reselection, state transition, or release of the radio resource control connection. The notification message sending module 704 may attach one or more of these items into the notification message: UE ID information, target cell information, and data number information. The notification message sending module 704 may further attach action indication information into the notification message to instruct Node B to: release the UE context, release the data, transfer the data to the target cell for sending, suspend sending, or resume sending, or any combination thereof.

Embodiment 4

A data receiving apparatus applicable to the UE in the Cell_FACH state is provided in this embodiment. The apparatus is located at the Node B side.

Figure 8:
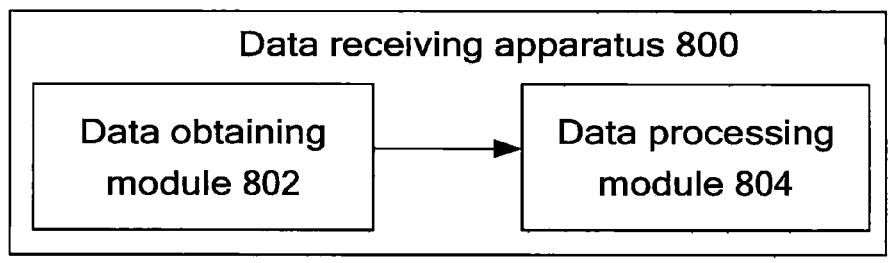
FIG. 8 is a block diagram of a data receiving apparatus of an UE in the Cell_FACH state in the fourth embodiment of the present disclosure.

As shown in FIG. 8, the data receiving apparatus 800 includes: a data obtaining module 802, adapted to receive one or more of these items from the RNC: data of the UE, UE ID, and data number, respond to the notification message sent by the RNC when a specific event occurs on the UE, and obtain the buffered data of the corresponding UE; and a data processing module 804, adapted to process the data obtained by the data obtaining module 802.

The notification message sent by the RNC carries: UE ID information, target cell information, data number information, or any combination thereof. In this way, the data obtaining module 802 searches for the buffered data of the corresponding UE by matching the UE ID/data number previously received from the RNC with the UE ID information/data number information carried in the notification message. Afterwards, the data processing module 804 may release the data found by the data obtaining module 802; and transfer the found data to the buffer of the target cell, and schedule sending of the data in the target cell, if the notification message carries target cell information.

Besides, if the notification message carries action indication information, the data processing module 804 may perform the following preset operations according to the action indication information:

(1) Transferring the data found by the data obtaining module 802 to the buffer of the target cell and scheduling the data for sending in the target cell, if the action indication information carried in the notification message indicates transferring of data to the target cell for sending.

(2) Releasing the data found by the data obtaining module 802, if the action indication information indicates releasing of the data or releasing of the UE context.

(3) Suspending scheduling of sending the data found by the data obtaining module 802, if the action indication information does not indicate transferring of data to the target cell, releasing of the UE context, or releasing of the data, but indicates suspension of sending.

(4) Beginning to schedule sending of the data found by the data obtaining module 802, if the action indication information does not indicate releasing of the UE context, transferring of data to the target cell, releasing of the data, or suspension of sending.

When a UE in the Cell_FACH state undergoes an event such as cell reselection, state transition, or release of the RRC connection, the technical solution under the present disclosure can reduce or try to avoid waste of radio channel resources, shorten the transmission delay and reduce the transmission packet loss ratio.

Although the disclosure has been described through some exemplary embodiments, the disclosure is not limited to such embodiments. It is apparent that those skilled in the art can make various modifications and variations to the present disclosure without departing from the spirit and scope of the present disclosure. The disclosure is intended to cover the modifications and variations provided that they fall in the scope of protection defined by the following claims or their equivalents.

What is claimed is:

1. A data communication method for data management applicable to a User Equipment (UE) in a Cell_Forward Access Channel (Cell_FACH) state, the method comprising:
receiving, by a Node B, data of one or more UEs in a Cell_FACH state from a Radio Network Controller (RNC), wherein the data of the one or more UEs is received through a frame which carries information that identifies the one or more UEs;
receiving, by the Node B, a notification message sent from the RNC, the notification message being related to a UE of the one or more UEs in the Cell_FACH state and in response to cell reselection of the UE in the Cell_FACH state, the notification message carrying information that identifies the UE;
if there is buffered data related to the UE identified by the information in the notification message,
transferring, by the Node B, the buffered data related to the UE identified by the information in the notification message to a target cell for sending in the target cell if the target cell is controlled by the Node B; and
deleting, by the Node B, the buffered data related to the UE identified by the information in the notification message if the target cell is not controlled by the Node B;
wherein the notification message further carries action indication information that instructs the Node B to transfer the buffered data related to the UE identified by the information in the notification message to a target cell for sending in the target cell if the target cell is controlled by the Node B and to delete the buffered data related to the UE identified by the information in the notification message if the target cell is not controlled by the Node B.

2. The method of claim 1, wherein the information to identify the UE comprises UE Identification (ID) information.

3. The method of claim 1, further comprising buffering the data received from the RNC identified by the information such that the buffered data corresponds to the data received from the RNC identified by the information.

4. The method of claim 1, wherein the method is performed in a 3rd Generation Partnership Project (3GPP) compliant system.

5. The method of claim 1, wherein receiving a notification message comprises receiving the notification message sent from the RNC via a transport bearer for a common transport channel.

6. An apparatus for data management applicable to a User Equipment (UE) in a Cell_Forward Access Channel (Cell_FACH) state, the apparatus comprising:
a data sending module configured to send data of one or more UEs in a Cell_FACH state to a Node B, wherein the data of the one or more UEs is sent through a frame which carries information that identifies the one or more UEs; and
a notification message sending module configured to send a notification message to the Node B, wherein the notification message is in response to cell reselection of a UE of the one or more UEs, wherein the notification message carries information that identifies the UE and action indication information that instructs the Node B to transfer buffered data related to the UE identified by the information in the notification message to a target cell for sending in the target cell if the target cell is controlled by the Node B and that instructs the Node B to delete the buffered data relate to the UE identified by the information in the notification message if the target cell is not controlled by the Node B;
wherein the notification message further carries action indication information that instructs the Node B to transfer the buffered data related to the UE identified by the information in the notification message to a target cell for sending in the target cell if the target cell is controlled by the Node B and to delete the buffered data related to the UE identified by the information in the notification message if the target cell is not controlled by the Node B.

7. The apparatus of claim 6, wherein the apparatus is a radio network controller (RNC).

8. An apparatus for data management applicable to a User Equipment (UE) in a Cell_Forward Access Channel (Cell_FACH) state, the apparatus comprising:
a receiver configured to receive data of one or more UEs in a Cell_FACH state from a Radio Network Controller (RNC), wherein the data of the one or more UEs is received through a frame which carries information that identifies the one or more UEs; and
a data buffer configured to buffer the data of the one or more UEs received from the RNC;
wherein the receiver is further configured to receive a notification message from the RNC, the notification message carrying information that identifies a UE of the one or more UEs and in response to cell reselection of the UE;
wherein the apparatus further comprises a processor configured to transfer buffered data related to the UE identified by the information in the notification message to a target cell for sending in the target cell if the target cell is controlled by the apparatus, and further configured to delete the buffered data related to the UE identified by the information in the notification message if the target cell is not controlled by the apparatus;
wherein the notification message further carries action indication information that instructs a Node B to transfer the buffered data related to the UE identified by the information in the notification message to a target cell for sending in the target cell if the target cell is controlled by the Node B and to delete the buffered data related to the UE identified by the information in the notification message if the target cell is not controlled by the Node B.

9. The apparatus of claim 8, wherein the apparatus is a Node B.

10. The apparatus of claim 8, wherein the information to identify the UE comprises UE Identification (ID) information.

11. The apparatus of claim 8, wherein the notification message further carries action indication information that instructs the processor to transfer the buffered data related to the UE identified by the information in the notification message to the target cell for sending in the target cell.

\* \* \* \* \*